(12) United States Patent
Cook

(10) Patent No.: US 8,277,060 B2
(45) Date of Patent: Oct. 2, 2012

(54) APPARATUS AND METHOD OF SHAPING A LASER BEAM PROFILE

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 476 days.

(21) Appl. No.: 12/359,645

(22) Filed: Jan. 26, 2009

(65) Prior Publication Data

US 2010/0188762 A1 Jul. 29, 2010

(51) Int. Cl.
*G02B 5/10* (2006.01)
(52) U.S. Cl. ........................ 359/850; 356/4.01
(58) Field of Classification Search .............. 359/29, 359/32, 850–861; 356/4.01, 432, 435
See application file for complete search history.

(56) References Cited

U.S. PATENT DOCUMENTS

| 3,674,334 | A | | 7/1972 | Offner |
| 4,101,195 | A | | 7/1978 | Frosch |
| 5,170,284 | A | | 12/1992 | Cook |
| 5,343,415 | A | | 8/1994 | Itoh et al. |
| 5,386,316 | A | * | 1/1995 | Cook ........................... 359/365 |
| 5,636,014 | A | | 6/1997 | Hanson |
| 5,973,858 | A | * | 10/1999 | Sekita ......................... 359/729 |
| 6,022,114 | A | | 2/2000 | Foo |
| 6,975,458 | B1 | | 12/2005 | Kanzler |
| 2002/0011852 | A1 | * | 1/2002 | Mandelis et al. ............. 324/752 |
| 2003/0179452 | A1 | | 9/2003 | Lizotte |
| 2006/0012863 | A1 | | 1/2006 | Goelles |
| 2006/0231771 | A1 | * | 10/2006 | Lee et al. ................... 250/458.1 |
| 2007/0242327 | A1 | | 10/2007 | Powell et al. |
| 2009/0257711 | A1 | * | 10/2009 | Ramachandran ............... 385/28 |

FOREIGN PATENT DOCUMENTS

EP  1617257 A1  1/2006

OTHER PUBLICATIONS

Bahaa E. A. Saleh & Malvin Carl Teich, Fundamentals of Photonics 127-134 (1991).*
Grant R. Fowles, Introduction to Modern Optics 114-121 (2nd ed. 1975).*
STIC Search (Jul. 2011).*
Goodman, Joseph W., Introduction to Fourier Optics, McGraw-Hill Book Company, 1968, pp. 62-65, 82-89.
European Search Report dated May 12, 2010 of EP Appln. No. 10151170.7 (6 pages).

* cited by examiner

*Primary Examiner* — Jennifer L. Doak
(74) *Attorney, Agent, or Firm* — Lando & Anastasi, LLP

(57) ABSTRACT

Various embodiments provide an apparatus and method for shaping a laser beam profile in which the apparatus includes a reformatting optical system configured to reformat a laser beam having a Gaussian intensity profile into a radiation beam having a top hat intensity profile; and a Fourier transforming optical system configured to transform the radiation beam having the top hat intensity profile into a radiation beam having a Bessel or sinc function intensity profile.

20 Claims, 9 Drawing Sheets

(BACKGROUND)

(BACKGROUND)

(BACKGROUND)

(BACKGROUND)

(BACKGROUND)

APPARATUS AND METHOD OF SHAPING A LASER BEAM PROFILE

BACKGROUND

This disclosure pertains to an apparatus and a method of shaping a laser beam profile for transmission via a LIDAR transmitter.

Light detection and ranging (LIDAR) is an optical remote sensing technology that measures properties of scattered light to find range and/or other information of a distant target. In LIDAR, a laser beam is often used to determine the distance to an object or to collect other information on the object. For example, the range to an object is determined by measuring the time delay between transmission of a laser pulse and detection of the reflected signal.

LIDAR is similar in many aspects to Radar technology. For example both LIDAR and Radar use radiation to project on an object and detect reflected radiation from the object. The primary difference is that LIDAR uses radiation with much shorter wavelengths. Typically, LIDAR uses near infrared, visible or ultraviolet radiation. The shorter wavelengths used in LIDAR allow measurement of smaller sized objects or object characteristics with higher resolution. Hence, LIDAR can be used for making measurements of smoke and other airborne particles (aerosols, clouds, and air molecules). For example, parameters such as the height, layering and densities of clouds, cloud particle properties (extinction coefficient, backscatter coefficient, depolarization), temperature, pressure, wind, humidity, trace gas concentration (ozone, methane, nitrous oxide, etc.) can be measured using LIDAR.

In general, lasers having a Gaussian intensity profile obtained by operating the lasers in the $TEA_{00}$ fundamental mode are often utilized in a LIDAR system. However, the use of a Gaussian profile in a LIDAR transmitter can have numerous drawbacks. For example, as illustrated in FIG. 1 which depicts a conventional Gaussian profile in a LIDAR transmitter compared to an ideal top hat profile, excess energy (E) may be received at the center of a receiver detector focal plane array (FPA), i.e., received at the center of the field of view (FOV) of the detector FPA, while much less energy is received at the edge of the FPA detector. Furthermore, as shown in FIG. 1, energy in the side wings of the Gaussian beam falls outside the projection of the field of view (FOV) of the FPA detector as compared with an ideal top hat profile which provides the needed amount of energy for the detector to output a meaningful signal. As a result, the side wings' energy is wasted. In addition, as shown in FIG. 1, a large transmitter-to-receiver (T/R) boresight error is typically allocated which leads to additional inefficiency in the LIDAR system.

Therefore, there is a need in the art for a laser beam shaping apparatus that can produce a top hat intensity beam profile to efficiently use the laser energy.

SUMMARY

One or more embodiments of the present disclosure provide an apparatus for shaping a laser beam profile. The apparatus includes a reformatting optical system configured to reformat a laser beam having a Gaussian intensity profile into a radiation beam having a top hat intensity profile; and a Fourier transforming optical system configured to transform the radiation beam having the top hat intensity profile into a radiation beam having a Bessel or sinc function intensity profile.

Another embodiment of the present disclosure provides a method of shaping a laser beam profile. The method includes reformatting a laser beam having a Gaussian intensity profile into a radiation beam having a top hat intensity profile; and transforming the radiation beam having the top hat intensity profile into a radiation beam having a Bessel or sinc function intensity profile.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
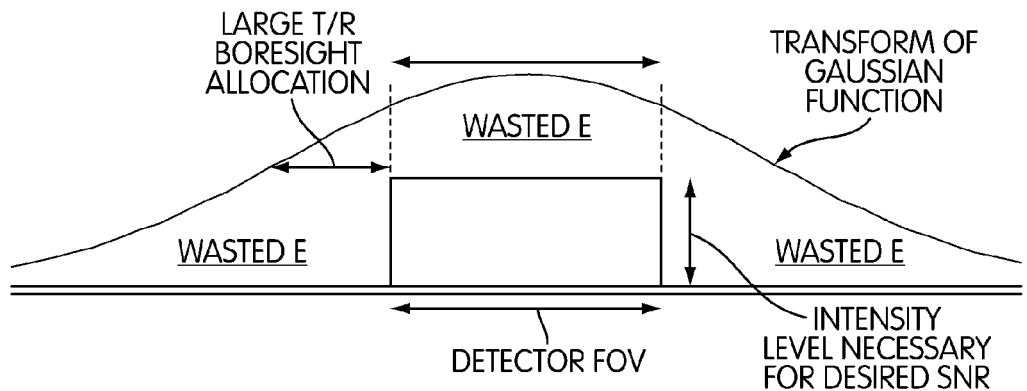
FIG. 1 shows a conventional Gaussian profile in a LIDAR transmitter and its relationship in the far-field to a receiver FPA projection.
Figure 2:
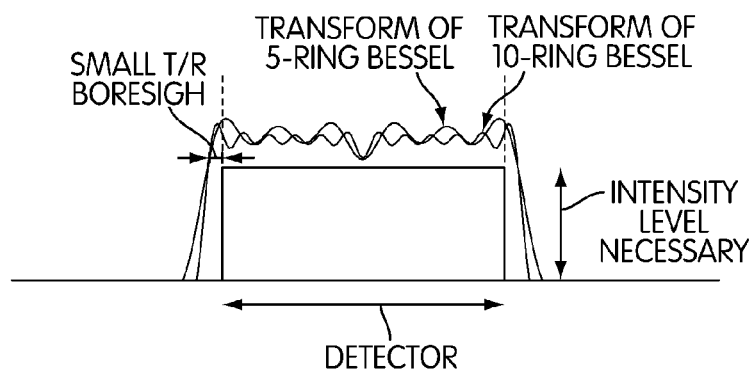
FIG. 2 shows a near top hat intensity profile or a top hat-like intensity profile of a laser beam and its relationship in the far-field to a receiver FPA projection.

FIG. 2 shows a near top hat intensity profile or a top hat-like intensity profile of a laser beam, according to an embodiment of the present disclosure. In one embodiment, the near top hat laser intensity profile can be the Fourier transform of a five ring Bessel intensity profile. In another embodiment, the near top hat laser profile can be the transform of a ten ring Bessel intensity profile. In FIG. 2, the near top hat laser intensity profile in the far-field is shown in relation to a receiver FPA projection. The relatively flat intensity level at the top of the near top hat laser intensity profile is slightly higher or approximately the same as an ideal threshold intensity level needed for the FPA detector to output a meaningful signal. Also, as shown in FIG. 2, the intensity in the side wings of the near top hat laser intensity profile follows approximately the projection of the field of view (FOV) of the FPA detector. As a result, contrary to the Gaussian profile depicted in FIG. 1, the energy wasted at the side wings of the of the near top hat laser intensity profile is substantially minimized. Hence, the near top hat nature of the transmitter beam puts only the required energy on the detector, with very small energy losses outside the field of view (FOV) of the detector. Furthermore, as shown in FIG. 2, a smaller tolerance on Transmit/Receive boresight allows a smaller overall transmitter divergence and less intensity loss.

Figure 3:
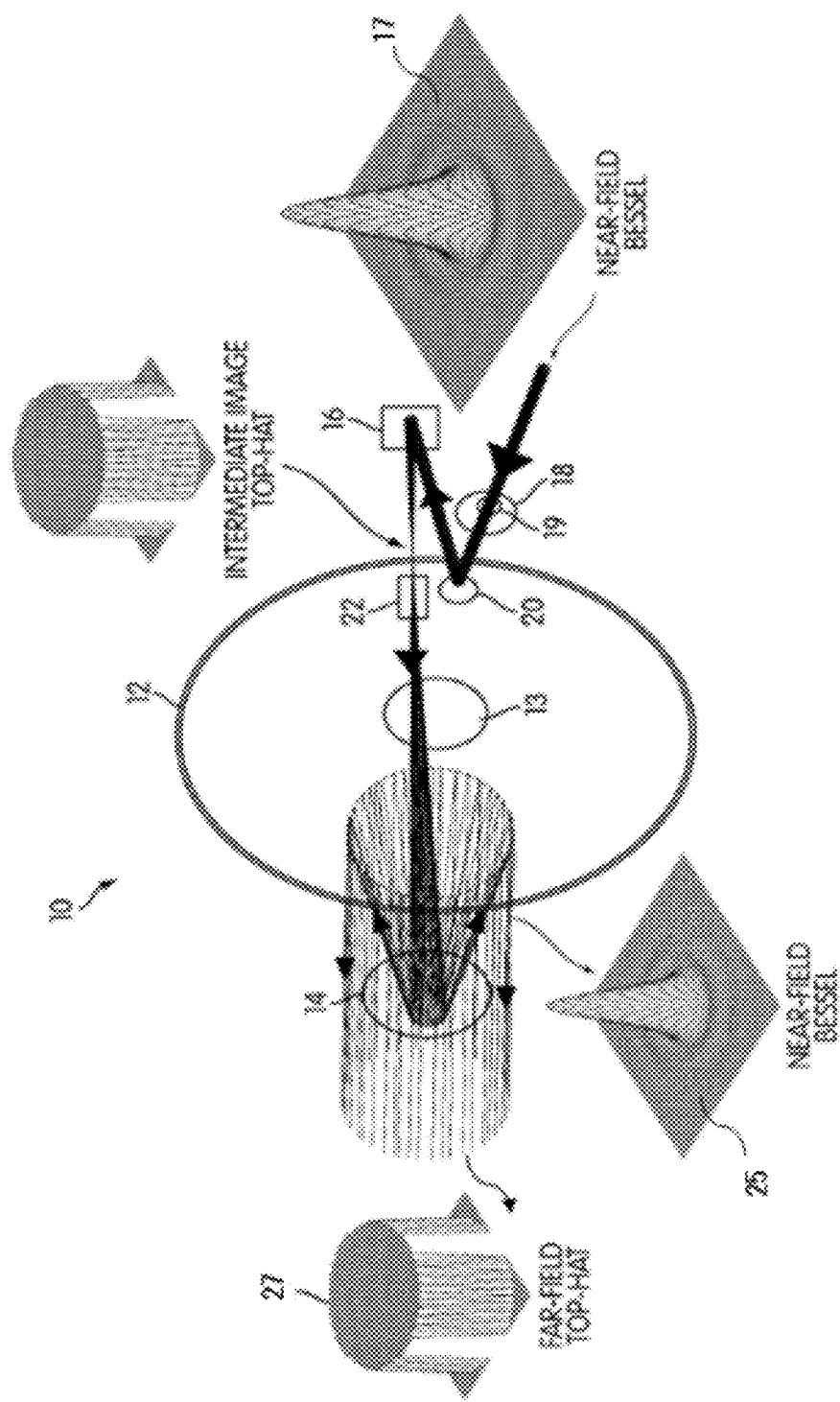
FIG. 3 is a schematic diagram of a LIDAR transmitter in which a laser beam at the near-field having a Bessel intensity profile is transmitted through the LIDAR transmitter to obtain a top hat laser intensity profile in the far-field, according to an embodiment.

FIG. 3 is a schematic diagram of a LIDAR transmitter in which a laser beam at the near-field having a Bessel intensity profile is transmitted through the LIDAR transmitter to obtain a top hat laser intensity profile in the far-field, according to an embodiment of the present disclosure. As shown in FIG. 3, LIDAR transmitter 10 includes primary mirror 12, secondary mirror 14 and tertiary mirror 16. In this embodiment, LIDAR transmitter 10 can be seen as an afocal three-mirror anastigmat optical system. A detailed description of an afocal three-mirror anastigmat optical system can be found in U.S. Pat. No. 3,674,334, the content of which is incorporated herein in its entirety. LIDAR transmitter 10 further includes transmitter-receiver (T/R) mirror 18. T/R mirror 18 has a hole 19 on its periphery. LIDAR transmitter 10 further includes beam steering mirror (BSM) 20 and static flat fold mirror 22.

In operation, a laser beam having a Gaussian intensity profile is transformed into a beam having a Bessel intensity profile by an optical beam profile shaping apparatus (not shown in FIG. 3) that will be described in detail in the following paragraphs. The beam having the Bessel intensity profile 17 in the near-field is input into LIDAR transmitter 10 and directed towards hole 19 in T/R mirror 18, as depicted in FIG. 3. Beam propagation directions are indicated in FIG. 3 by thick straight arrows superimposed on the beam. T/R mirror 18 passes the input radiation beam and reflects the returning received radiation. The beam having the Bessel intensity profile 17 traverses hole 19 in T/R mirror 18 to impinge upon BSM 20 which steers the beam towards tertiary mirror 16. Tertiary mirror 16 is a focusing mirror. Tertiary mirror 16 focuses the beam at a focus point near static flat fold mirror 22. The intensity profile of the beam at or near the focus point is a top hat intensity profile. The beam with the top hat intensity profile impinges static flat fold mirror 22, which directs the beam through opening 13 in primary mirror 12 towards secondary mirror 14. Secondary mirror 14 is a negative power diverging mirror. The beam is reflected back by secondary mirror 14 towards primary mirror 12. The beam reflected by secondary mirror 14 is then reflected by primary mirror 12 which sends the collimated beam to the far-field for large distances (e.g., hundreds to thousands of kilometers). The intensity profile of the beam after reflection from primary mirror 12 is transformed back to a near-field Bessel intensity profile 25, as shown in FIG. 3 by the curved arrow pointing to the near-field Bessel intensity profile 25. The beam intensity profile at far-field is a top hat intensity profile 27 (as shown in FIG. 3 by the curved arrow pointing to the far-field top-hat intensity profile 27). Hence, when transmitting a near-field Bessel beam intensity profile through a LIDAR transmitter such as LIDAR transmitter 10, the beam output at far-field has a top hat intensity profile. On the other hand, if the near-field beam profile were a Gaussian beam profile, the profile of the output beam of the LIDAR transmitter 10 at far-field would have been a Gaussian intensity profile. Therefore, rather than transmit a near-field Gaussian profile to obtain a far-field Gaussian profile, which is not desirable as discussed above, one would instead transmit a near-field truncated Bessel profile to obtain an approximate top-hat function or profile at far-field.

Figure 4:
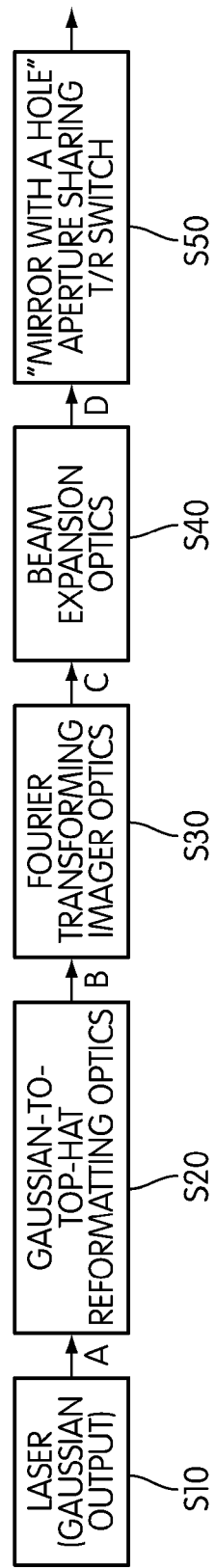
FIG. 4 is a schematic diagram of a process for transforming a laser beam having Gaussian intensity profile into a radiation beam having a Bessel intensity profile, according to an embodiment.
Figure 5A:
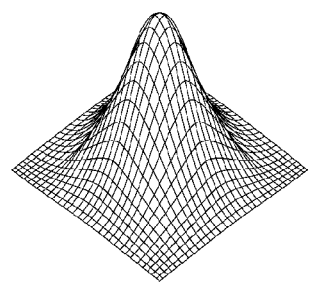
FIG. 5A depicts a Gaussian intensity profile of a laser beam input.
Figure 5B:
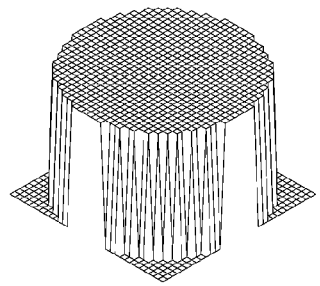
FIG. 5B depicts a top hat intensity profile obtained by reformatting the Gaussian profile depicted in FIG. 5A.
Figure 6A:
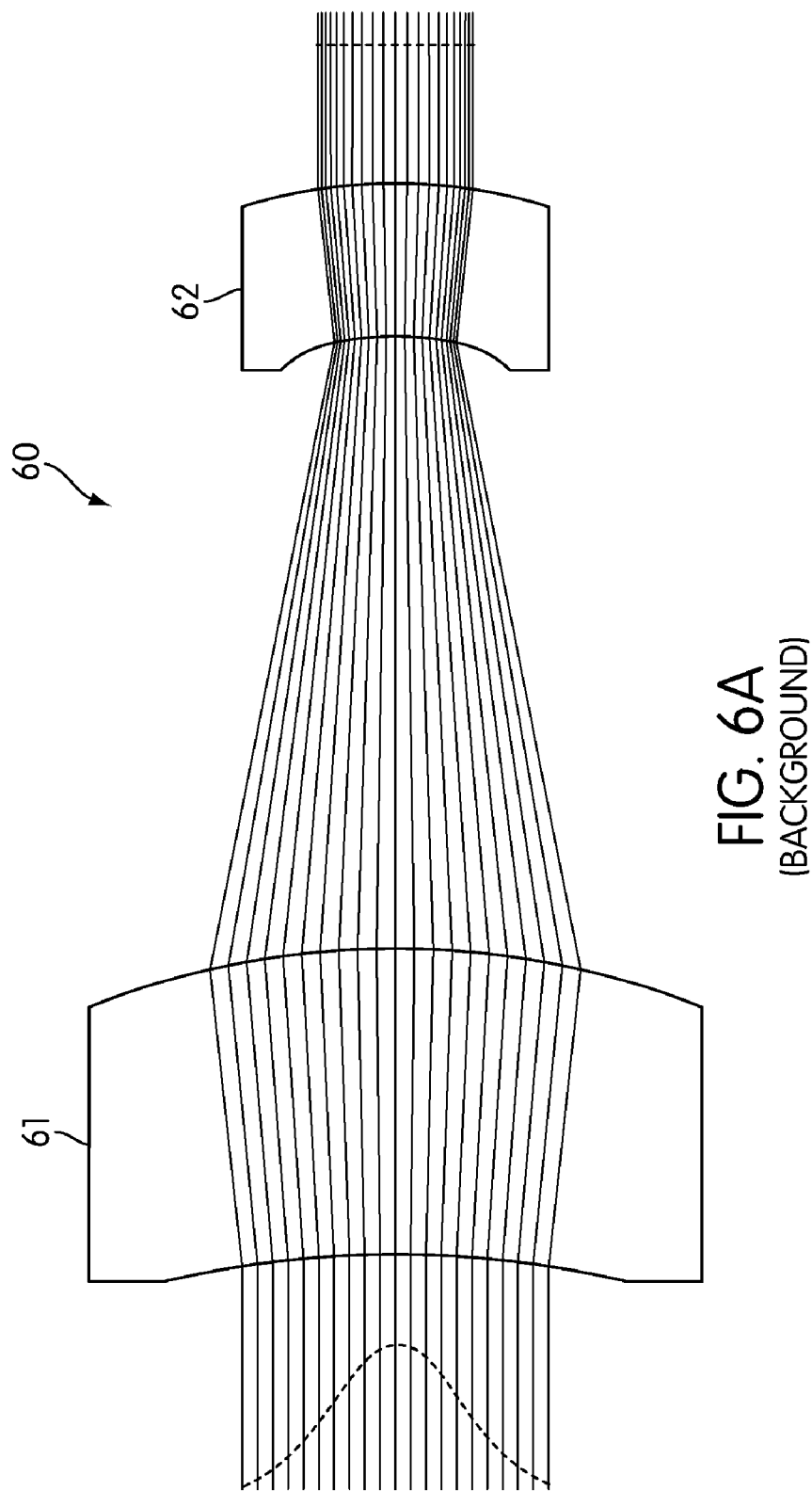
FIG. 6A shows a detailed ray trace of the operation of a conventional Gaussian to top hat reformatting optical system.

FIG. 4 is a schematic diagram of steps for transforming a laser beam having Gaussian intensity profile into a beam having a Bessel intensity profile, according to an embodiment. A laser outputs a beam having a Gaussian intensity profile A (shown in FIG. 5A), at S10, such as the Gaussian intensity profile of the fundamental mode $TEM_{00}$. The beam having the Gaussian profile A is reformatted into a beam having a top hat intensity profile B (shown in FIG. 5B) using conventional refractive optical system (reformatting optical system) 60, at S20. An example of conventional refractive optical system 60 for transforming a beam having a Gaussian intensity profile into a beam having a top hat intensity profile is shown in FIG. 6A. FIG. 6A shows a detailed ray trace of the operation of conventional Gaussian to top hat reformatting optical system 60. Gaussian to top hat reformatting optical system 60 includes a pair of optical elements 61, 62 having aspherical optical surfaces. Rays near the edge of the Gaussian beam intensity profile input which carry very little energy are significantly compressed, while the rays near the center of the Gaussian beam intensity profile input which carry most of the energy are not compressed, resulting in the Gaussian beam intensity profile being transformed into a top hat beam intensity profile.

Figure 5C:
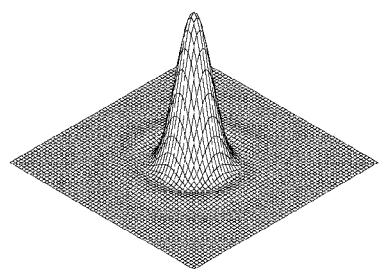
FIG. 5C depicts a Bessel intensity profile obtained by Fourier transforming the top hat intensity profile depicted in FIG. 5B.
Figure 6B:
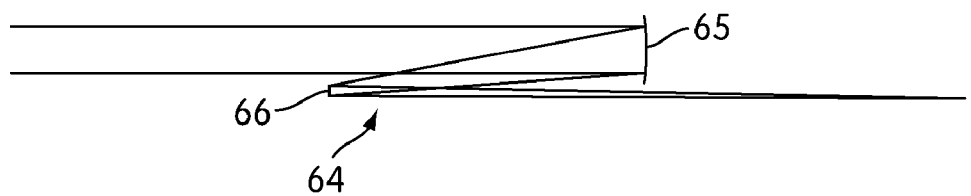
FIG. 6B shows an example of a conventional Fourier transforming imager optical system.

Returning to FIG. 4, the beam with the top hat intensity profile B is input through a Fourier transforming imager optical system or Fourier transform imager, at S30 to transform the beam having the top hat intensity profile B (shown in FIG. 5B) into a beam having a Bessel intensity, profile C (shown in FIG. 5C). FIG. 6B shows an example of conventional Fourier transforming imager optical system 64. In this embodiment, Fourier transforming imager optical system 64 includes two mirrors 65 and 66. The beam having a top hat intensity profile impinges first mirror 65 which focuses and directs the beam towards the second mirror 66. In other words, first mirror 65 receives the beam having the top hat intensity profile from reformatting optical system 60, and directs the beam towards second mirror 66. Second mirror 66, in turn, directs the beam towards beam expansion optical system (beam expander) 68 for further processing. The beam directed towards beam expander 68 is a Bessel intensity profile C (as shown in FIG. 5C).

Figure 5D:
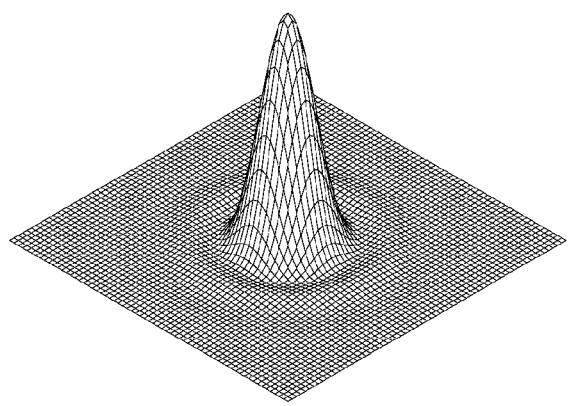
FIG. 5D depicts an expanded Bessel intensity profile obtained by expanding the Bessel intensity profile depicted in FIG. 5C.
Figure 6C:
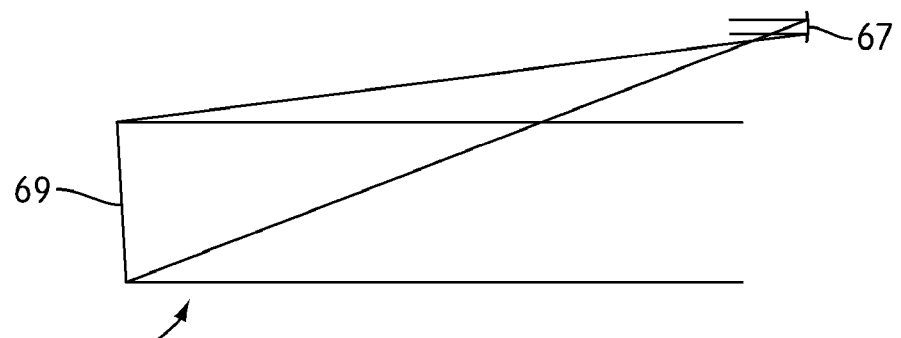
FIG. 6C shows an example of a conventional beam expansion optical system.

The beam output by Fourier transforming imager optical system 64 having the Bessel intensity profile C (shown in FIG. 5C) is input into beam expansion optical system (beam expander) 68 at S40 to obtain an expanded beam with a Bessel intensity profile D (shown in FIG. 5D). FIG. 6C shows an example of conventional beam expansion optical system (beam expander) 68. In this embodiment, beam expansion optical system 68 includes two mirrors 67 and 69. The beam having a smaller Bessel intensity profile impinges first mirror 67 (i.e., the first mirror 67 receives the beam having the smaller Bessel intensity profile) which expands or enlarges and directs the beam towards second mirror 69. Second mirror 69, in turn, directs the beam having an expanded Bessel intensity profile towards an output of beam expander 68 to be transmitted to other optical systems for further processing. Hence, conventional beam expansion optical system (beam expander) 68 may be utilized to scale and truncate the Bessel intensity profile.

The beam output by beam expander 68 having a Bessel intensity profile D (shown in FIG. 5D) is inserted or input at S50 in the beam delivery optical system such as the LIDAR transmitter 10, through T/R mirror 18.

The ideal top hat function and the Bessel function are known Fourier Transform pairs. In order to get an ideal top hat function from a transformed Bessel function, the Bessel function must extend to infinity. However, selecting a Bessel function that extends to infinity (or that extends to very large orders) can put a burden on the user to provide such a Bessel function, such as requiring the use of large optics. Therefore, an approximate solution may be selected in which the burden is limited by selecting a truncated Bessel function, but which, when Fourier transformed, would result in a top hat-like function approximating an ideal top hat function.

Figure 7A:
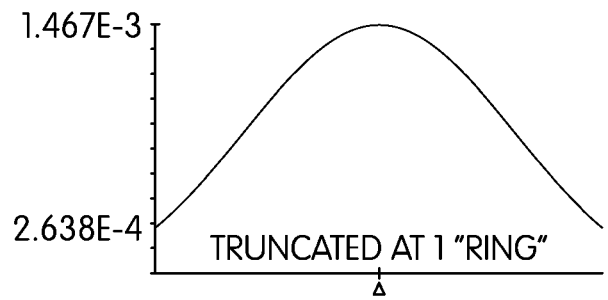
FIG. 7A is a graph showing a computed Fourier transform of a central lobe of a Bessel function.
Figure 7B:
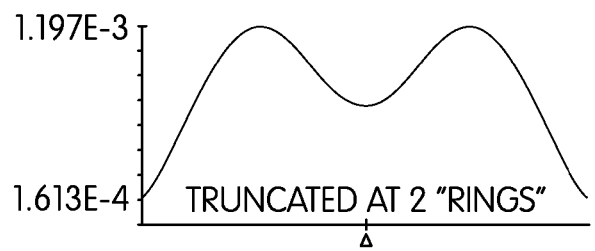
FIG. 7B is a graph showing a computed Fourier transform of a Bessel function truncated at two rings.
Figure 7C:
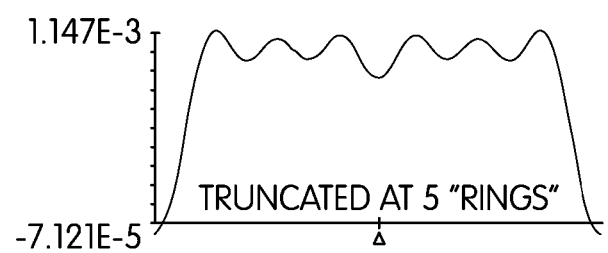
FIG. 7C is a graph showing a computed Fourier transform of a Bessel function truncated at five rings.
Figure 7D:
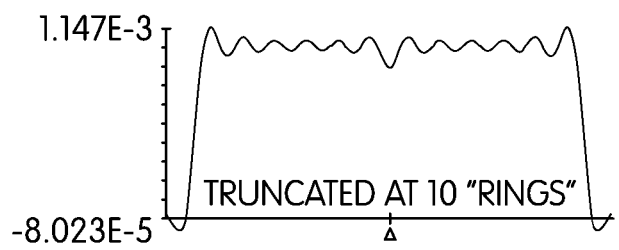
FIG. 7D is a graph showing a computed Fourier transform of a Bessel function truncated at ten rings.

In order to determine the effects of various amounts of truncation of the Bessel function on the resulting top hat-like function, Fourier transforms of the truncated Bessel function are computed. FIG. 7A is a graph showing a computed Fourier transform of a central lobe of a Bessel function. FIG. 7B is a graph showing a computed Fourier transform of a Bessel function truncated at two "rings." FIG. 7C is a graph showing a computed Fourier transform of a Bessel function truncated at five "rings." FIG. 7D is a graph showing a computed Fourier transform of a Bessel function truncated at ten "rings." As shown in FIG. 7A, truncation at the first Bessel zero gives a remarkably good approximation to a Gaussian function. This is because the central peak of the Bessel function is very Gaussian-like. As shown in FIG. 7B, truncation of the Bessel function at two rings results in a Fourier transform resembling twin mountain peaks. As shown in FIG. 7C, truncation of the Bessel function at 5 Bessel rings gives a good approximation to the desired top hat profile. As shown in FIG. 7D, truncation of the Bessel function at 10 Bessel rings, provides a somewhat flatter top with more and smaller oscillations across the top hat, and results in the sides being somewhat steeper. However, overall truncating the Bessel at 10 instead of 5 "rings" does not provide significant improvement in the resulting near top hat profile. Therefore, a Bessel function truncated at 5 rings or more (for example between 5 and 10) provides the desired approximate or near top hat profile.

The relationship between a uniform circular input circ(x) (e.g., from a circular aperture) and the resulting Bessel function representation of the diffraction pattern $$\left(\frac{J_1(x)}{x}\right)^2,$$

as well as the relationship of the uniform rectangular input rect(x) (e.g., from a rectangular aperture) and the sinc function representation of the diffraction pattern $sinc^2(x)$ are derived by Joseph W. Goodman on pages 62-65 of his book entitled "Introduction to Fourier Optics," McGraw-Hill, First Edition, the contents of which are incorporated herein by reference. As it can be appreciated, the teachings of the present disclosure apply equally to both aperture shapes (circular aperture and rectangular aperture), and the terms Bessel function and sinc function have only the distinction of aperture shape.

The process of Fourier transforming the top hat illumination beam to a sinc (or Bessel) function with the desired scale or size can be done theoretically and sometimes practically by the process shown in FIG. 4. The imager, i.e., the Fourier transform imager, 64 is used for transforming the top hat intensity profile (output by the reformatting optical system 60) into the Bessel intensity profile, followed by the beam expander 68 to achieve the desired size for the Bessel intensity profile. The Fourier transform of a top hat function is a sinc function (sin x/x) or a Bessel function of the first kind. The diameter $D_{sinc}$ of the central maximum of the sinc function (or Bessel function) is given by the equation (1).

$$D_{sinc} = 2\lambda F_{number} \quad (1)$$

where the $F_{number}$ is equal to the focal length f divided by the effective aperture diameter $D_{aperture}$, as shown in equation (2).

$$F_{number} = \frac{f}{D_{aperture}} \quad (2)$$

Hence, by substituting equation (2) in equation (1), the diameter of the sinc function can be expressed by the following equation (3).

$$D_{sin\,c} = 2\lambda \frac{f}{D_{aperture}} \quad (3)$$

Therefore, it can be seen that in order to achieve a large size sinc function, a large or slow $F_{number}$ is needed. However, since for a given aperture size (i.e., for a fixed $D_{aperture}$), a large $F_{number}$ is only achieved using a long focal length optic (i.e., large f), the size of the Fourier transform optic can become prohibitively large. Therefore, a beam expander can be used to relax the need for a long focal length Fourier transform optic.

In the following discussion, the terms beam, object, function, and illumination pattern or profile can be used interchangeably to describe the input to be transformed. Also, the terms imager, optic, optical system, and lens can be used interchangeably to describe the apparatus that performs the optical Fourier transform, i.e., the optical beam profile shaping apparatus.

According to classical Fourier transform theory, a true Fourier transform is only achieved in a f-f configuration. In the f-f configuration, the function (or illumination pattern, shape, profile or object) to be transformed is located one focal length in front of the lens of focal length f, and the Fourier transform is present at a location that is one focal length behind the lens, at a distance f from the lens. In optics terminology, this condition is also called the telecentric condition, where the chief rays (i.e., rays passing through the center of the object at various angles) are all parallel to each other.

For objects located at other than one focal length in front of the lens, the Fourier transform is still located one focal length behind the optic, but the transform contains a quadratic phase term that is either + or −, depending on whether the object is closer or farther than one focal length from the optic. A detailed discussion of this phenomenon can be found in pages 85 through 87 of "Introduction to Fourier Optics" by Joseph W. Goodman, McGraw-Hill, First Edition, the contents of which are incorporated herein by reference. This corresponds optically to the convergence or divergence of the chief rays, which is the departure from the telecentric condition. In order to achieve a true Fourier transform without the quadratic phase term, the object (function, profile or pattern) must be located one focal length in front of the transforming lens or optic. If, as discussed in the above paragraphs, a long focal length lens (needed to achieve a large size sinc function) can create a size problem, the requirement to locate the object one focal length in front of the optic can further compound the size problem. In one embodiment, in the telecentric configuration, the object (beam, function, illumination pattern or profile) may also serve as a stop. Alternatively, or in addition, a stop may be provided on the object side.

In order to solve the size problem and in order to eliminate the need for two separate optical systems (i.e., the Fourier transform imager and the beam expander) in which each of the two optical systems utilizes at least two mirrors, a "three-mirror" optical design that can achieve the true Fourier transform while having a physical length that is many times smaller than the focal length is described in the following paragraphs.

Figure 8A:
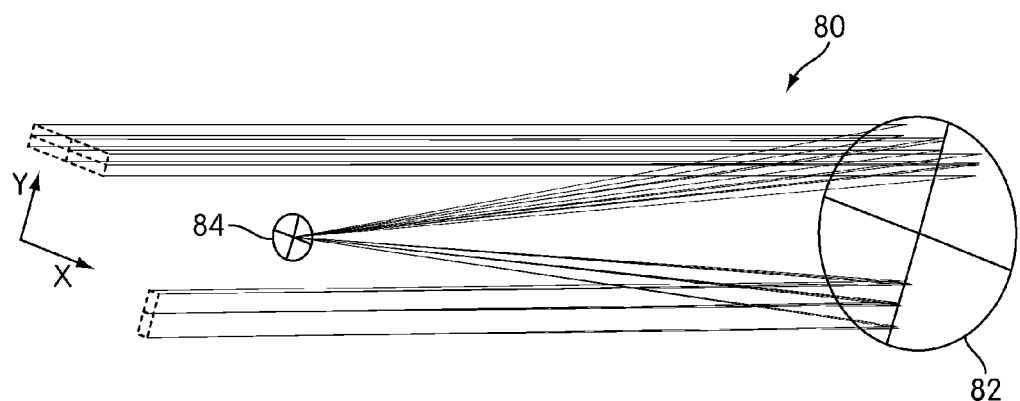
FIG. 8A is an isometric view of a "three-mirror" optical Fourier transform system combining the functions of a Fourier transform imager and a beam expander, according to an embodiment of the present disclosure.
Figure 8B:
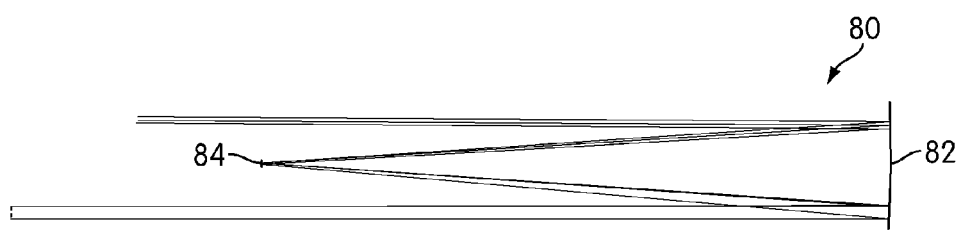
FIG. 8B is a side view of the "three-mirror" optical system shown in FIG. 8A.
Figure 8C:
FIG. 8C is a top view of the "three-mirror" optical system shown in FIG. 8A.

FIG. 8A is an isometric view of "three-mirror" optical Fourier transform system 80 combining the functions of the Fourier transform imager and the beam expander, according to an embodiment. FIG. 8B is a side view of the three-mirror optical system shown in FIG. 8A. FIG. 8C is a top view of the three-mirror optical system shown in FIG. 8A. In the embodiment shown in FIGS. 8A, 8B and 8C, optical system 80 combining the functions of the Fourier transform imager and the beam expander has, in fact, two mirrors 82 and 84. In this embodiment, the first (primary) and third (tertiary) mirrors are the same, and single mirror 82 has one reflection prior to a reflection from second mirror 84 and one reflection subsequent to reflection from the second mirror 84. However, instead of providing a single mirror 82 that combines the primary and tertiary mirrors, two separate and distinct primary and tertiary mirrors can also be used. First mirror 82 may be configured to receive the radiation beam having the top hat intensity profile from reformatting optical system 60 and reflect the radiation beam towards second mirror 84. Second mirror 84 may be configured to reflect the radiation beam received from first mirror 82 towards third mirror 82 (in this embodiment the first mirror and the third mirror are a single and same mirror). Third mirror 82 may be configured to direct the radiation beam received from second mirror 84 towards an output of Fourier transforming optical system 80.

In optical system 80, the first two mirrors (first or primary mirror 82 and second or secondary mirror 84) form a high telephoto ratio Cassegrain that compress the physical length between first mirror 82 and second mirror 84 relative to the focal length of the Cassegrain, and third or tertiary mirror 82 (which in the embodiment illustrated is the same as first or primary mirror 82) is a positive power field mirror to achieve the telecentric condition to relax the "one focal length" distance requirement for placement of the object to be transformed.

Optical system 80 depicted above is compact, in that its overall physical length is about ⅟₂₈ of the length needed to achieve the f-f configuration. Further, optical system 80 is telecentric, so the true Fourier transform is created without any quadratic phase term. In one embodiment, optical system 80 can accept a rectangular shaped input (for example, as shown in FIGS. 8A, 8B and 8C with an aspect ratio of 1:4) and operate at very slow $F_{numbers}$ (e.g., F/245 by F/981). Thus, using equation (1), the central peak of the sinc function transform, at a wavelength λ equal to about 1 μm (about 1000 nm), can be calculated to be about 0.490 mm by about 1.962 mm.

Although the example above is given at a wavelength of about 1000 nm, as it can be appreciated, optical system 80 can be used at any wavelength in the infrared spectrum (IR), the visible spectrum, or the ultraviolet spectrum, as desired.

A specific prescription for an embodiment of the optical system illustrated in FIGS. 8A, 8B and 8C is given in Table 1.

TABLE 1

| Description | Surface | Radius | Conic Constant | Thickness | Material |
| --- | --- | --- | --- | --- | --- |
| Entrance Pupil | 1 | ∞ | n/a | 35.0000 | Air |
| Primary | 2 | −52.9056 | −1.000000 | −25.0092 | Reflective |
| Secondary | 3 | −2.8612 | −0.962637 | 25.0092 | Reflective |
| Tertiary | 4 | −52.9056 | −1.000000 | −30.0000 | Air |
| Image | 5 | ∞ | n/a | n/a | Air |

Entrance Aperture Dimension is 0.5 in y-direction by 2.0 in x-direction
Aperture offset is 2.0 in y-direction
FOV offset is 0.2 deg. in alpha
Focal length F is 489.17
$F_{number}$ is F/978 (or about 978) in y-direction by F/245 (or about 245) in x-direction
Effective FOV diameter is 0.04 deg.

Figure 9A:
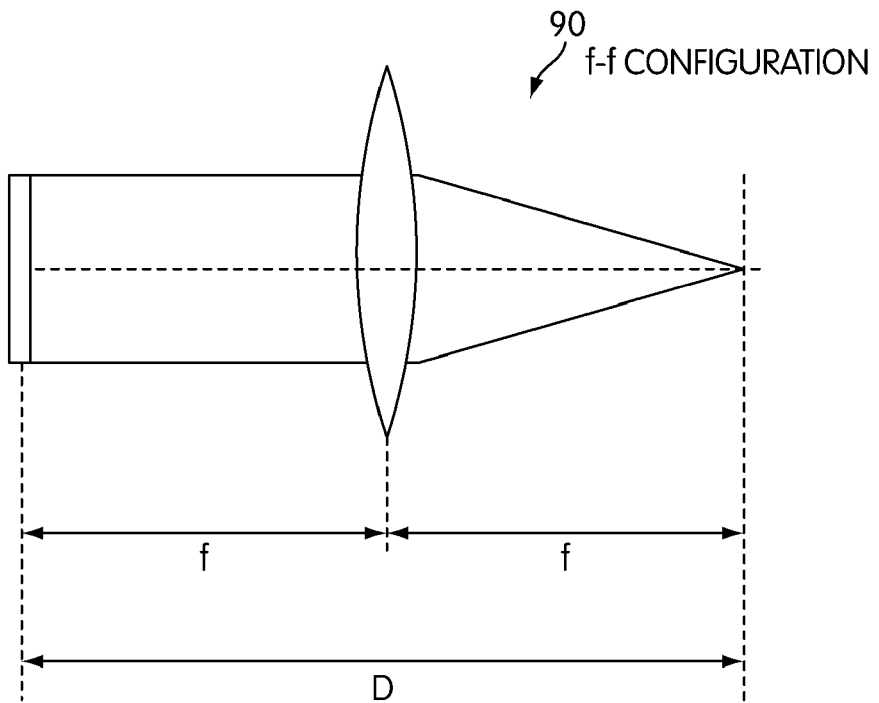
FIG. 9A is a schematic representation of a conventional f-f optical configuration.
Figure 9B:
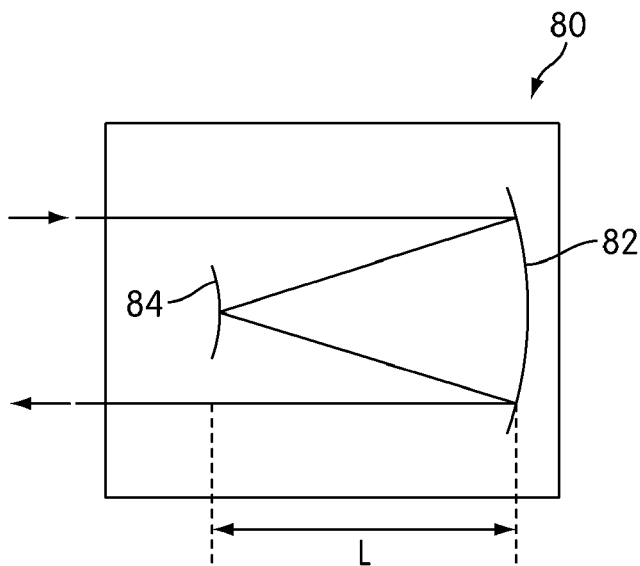
FIG. 9B is a schematic representation of the optical system shown in FIG. 8A.

In one embodiment of the optical Fourier transform system, classical or conventional f-f configuration 90, illustrated in FIG. 9A, for focal length (f) equal to about 4.9 meter would have an overall length D of about 9.8 meters (2×4.9 m) or about 386 inches. Whereas, as illustrated in FIG. 9B, the "three mirror" optical Fourier transform such as optical system 80 reduces the length of the optical Fourier transform system, i.e., the length L between first mirror 82 and second mirror 84, to about 14 inches (about 0.35 m). Thus, a reduction in length by a factor of about 28 can be achieved (i.e., D/L is equal to about 28). In most situations, the length of optical Fourier transform system can be reduced by a factor of at least about 20.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

I claim:

1. An apparatus for shaping a laser beam profile, comprising:
a reformatting optical system configured to reformat a laser beam having a Gaussian intensity profile into a radiation beam having a top hat intensity profile; and
an optical system configured to Fourier transform the radiation beam having the top hat intensity profile into a radiation beam having a Bessel or sinc function intensity profile, the optical system including a first mirror, a second mirror and a third mirror, the first mirror configured to receive the radiation beam having the top hat intensity profile from the reformatting optical system and reflect the radiation beam towards the second mirror, the second mirror configured to reflect the radiation beam received from the first mirror towards the third mirror, and the third mirror is configured to direct the radiation beam received from the second mirror towards an output of the Fourier transforming optical system;

wherein the first mirror and the second mirror form a high telephoto ratio Cassegrain optical system, in which the physical length between the first mirror and the second mirror is reduced by a factor of at least 20 as compared to a conventional f-f Fourier transform configuration.

2. The apparatus of claim 1, wherein the optical system further comprises:

a beam expander configured to reshape the radiation beam having the Bessel or sinc function intensity profile into a radiation beam having an expanded Bessel or sinc function intensity profile.

3. The apparatus of claim 2, wherein the beam expander is further configured to scale and to truncate the Bessel or sinc function intensity profile into an expanded Bessel or sinc function intensity profile.

4. The apparatus of claim 1, wherein the third mirror is a positive power field mirror that achieves a telecentric condition.

5. The apparatus of claim 1, wherein the optical system configured to Fourier transform the radiation beam is telecentric.

6. The apparatus of claim 1, wherein the radiation beam having the Bessel or sinc function intensity profile is input into a LIDAR transmitter.

7. The apparatus of claim 6, wherein a radiation beam output by the LIDAR transmitter has a top hat intensity profile at far-field.

8. The apparatus of claim 1, wherein the first mirror and the third mirror are included in a single mirror.

9. A method of shaping a laser beam profile, comprising:
reformatting a laser beam having a Gaussian intensity profile into a radiation beam having a top hat intensity profile; and
transforming the radiation beam having the top hat intensity profile into a radiation beam having a Bessel or sinc function intensity profile by using an optical system including a first mirror and a second mirror, wherein a physical length between the first mirror and the second mirror is reduced by a factor of at least 20 as compared to a conventional f-f Fourier transform configuration.

10. The method of claim 9, wherein transforming the radiation beam having the top hat intensity profile into the radiation beam having the Bessel intensity profile includes:

reshaping the radiation beam having the Bessel or sinc function intensity profile into a radiation beam having an expanded Bessel or sinc function intensity profile.

11. The method of claim 10, wherein reshaping the radiation beam comprises scaling and truncating the Bessel or sinc function intensity profile into the expanded Bessel or sinc function intensity profile.

12. The method of claim 9, further comprising inputting the radiation beam having the Bessel or sinc function intensity profile into a LIDAR transmitter at near-field.

13. The apparatus of claim 12, further comprising outputting, by the LIDAR transmitter, a radiation beam having a top hat intensity profile.

14. An apparatus for shaping a laser beam profile, comprising:

a reformatting optical system configured to reformat a laser beam having a Gaussian intensity profile into a radiation beam having a top hat intensity profile; and an optical system configured to Fourier transform the radiation beam having the top hat intensity profile into a radiation beam having a Bessel or sinc function intensity profile, the optical system comprising a first mirror and a second mirror, the first mirror configured to receive the radiation beam having the top hat intensity profile from the reformatting optical system and reflect the radiation beam towards the second mirror, and the second mirror configured to reflect the radiation beam received from the first mirror back towards the first mirror; and wherein the first mirror is further configured to direct the radiation beam received from the second mirror towards an output of the optical system.

15. The apparatus of claim 14, wherein the optical system is further configured to reshape the radiation beam having the Bessel or sinc function intensity profile into a radiation beam having an expanded Bessel or sinc function intensity profile.

16. The apparatus of claim 15, wherein the optical system is further configured to scale and to truncate the Bessel or sinc function intensity profile into the expanded Bessel or sinc function intensity profile.

17. The apparatus of claim 14, wherein the optical system configured to Fourier transform the radiation beam is telecentric.

18. The apparatus of claim 14, wherein a physical length between the first mirror and the second mirror is reduced by a factor of at least 20 as compared to a conventional f-f Fourier transform configuration.

19. The apparatus of claim 14, wherein the radiation beam having the Bessel or sinc function intensity profile is input into a LIDAR transmitter.

20. The apparatus of claim 19, wherein a radiation beam output by the LIDAR transmitter has a top hat intensity profile at far-field.

* * * * *